(12) United States Patent
Ukai et al.

(10) Patent No.: US 8,298,321 B2
(45) Date of Patent: Oct. 30, 2012

(54) RIVER WATER UTILIZING FLUE GAS DESULFURIZATION SYSTEM AND HUMIC SUBSTANCE REMOVING METHOD

(75) Inventors: Nobuyuki Ukai, Tokyo (JP); Takashi Yoshimoto, Tokyo (JP); Tatsuto Nagayasu, Tokyo (JP); Susumu Okino, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 303 days.

(21) Appl. No.: 12/674,270

(22) PCT Filed: Nov. 25, 2009

(86) PCT No.: PCT/JP2009/069835
§ 371 (c)(1),
(2), (4) Date: Feb. 19, 2010

(87) PCT Pub. No.: WO2010/150424
PCT Pub. Date: Dec. 29, 2010

(65) Prior Publication Data
US 2011/0259195 A1    Oct. 27, 2011

(30) Foreign Application Priority Data

Jun. 26, 2009  (JP) .................................. 2009-152830

(51) Int. Cl.
*B01D 53/14* (2006.01)
(52) U.S. Cl. .................... 96/1; 95/235; 95/152; 96/235; 96/243; 96/244; 210/663; 210/723; 210/739; 210/741; 210/743; 210/96.1; 210/97; 210/198.1
(58) Field of Classification Search .................... 95/152, 95/235
See application file for complete search history.

(56) References Cited

U.S. PATENT DOCUMENTS

| | | | | | |
|---|---|---|---|---|---|
| 3,481,868 | A | * | 12/1969 | Des Chatelets et al. | ...... 210/715 |
| 3,581,895 | A | * | 6/1971 | Howard et al. | ............... 210/108 |
| 3,870,633 | A | * | 3/1975 | Setterstrom | .................... 210/136 |

(Continued)

FOREIGN PATENT DOCUMENTS

JP    3-52623 A    3/1991

(Continued)

OTHER PUBLICATIONS

International Search Report of PCT/JP2009/069835, dated Jan. 12, 2010.

(Continued)

*Primary Examiner* — Duane Smith
*Assistant Examiner* — Ives Wu
(74) *Attorney, Agent, or Firm* — Westerman, Hattori, Daniels & Adrian, LLP

(57) ABSTRACT

A river water utilizing flue gas desulfurization system 10 according to an embodiment of the present invention includes: a pre-treatment facility 13 that removes humic substances in river water 11 to produce makeup water 12; and a desulfurization apparatus 17 that brings sulfur content in flue gas 15 into contact with limestone gypsum slurry 16 in an apparatus body 14. The pre-treatment facility 13 includes a flocculant mixing basin 22 in which a flocculant 21 is added to the river water 11 to flocculate and remove the humic substances contained in the river water 11; and an activated carbon absorption unit 23 in which the humic substances contained in the river water 11 are absorbed and removed by way of activated carbon.

17 Claims, 5 Drawing Sheets

U.S. PATENT DOCUMENTS

| | | | | |
|---|---|---|---|---|
| 4,246,102 | A * | 1/1981 | Hjelmner et al. | 210/704 |
| 4,337,230 | A * | 6/1982 | Ellestad et al. | 423/243.03 |
| 4,687,649 | A * | 8/1987 | Kuroda et al. | 423/243.03 |
| 4,693,798 | A * | 9/1987 | Gale et al. | 588/303 |
| 4,834,955 | A * | 5/1989 | Mouche et al. | 423/243.05 |
| 5,460,723 | A * | 10/1995 | Bourbigot et al. | 210/639 |
| 5,466,367 | A * | 11/1995 | Coate et al. | 210/96.1 |
| 5,520,482 | A * | 5/1996 | Oeste et al. | 405/263 |
| 5,683,587 | A * | 11/1997 | Ferrara et al. | 210/696 |
| 5,827,959 | A * | 10/1998 | Clanin | 73/198 |
| 6,576,594 | B2 * | 6/2003 | Nier et al. | 504/152 |
| 7,138,049 | B2 * | 11/2006 | Hunniford et al. | 210/143 |
| 2009/0166276 | A1 * | 7/2009 | Abe et al. | 210/138 |

FOREIGN PATENT DOCUMENTS

| | | |
|---|---|---|
| JP | 6-126127 A | 5/1994 |
| JP | 7-204412 A | 8/1995 |
| JP | 10-113650 A | 5/1998 |
| JP | 2000-107559 A | 4/2000 |
| JP | 2001-79561 A | 3/2001 |
| JP | 2002-11498 A | 1/2002 |
| JP | 2008-68200 A | 3/2008 |
| JP | 2008-126223 A | 6/2008 |
| JP | 2009-106898 A | 5/2009 |

OTHER PUBLICATIONS

Written Opinion of International Application No. PCT/JP2009/069835 mailed Jan. 12, 2010.

Notification Concerning Submission or Transmittal of Priority Document (Form PCT/IB/304) for International application No. PCT/JP2009/069835 mail dated Jan. 18, 2010.

Patent Abstract of Japan, publication No. 03-052623 dated Mar. 6, 1991.

* cited by examiner

RIVER WATER UTILIZING FLUE GAS DESULFURIZATION SYSTEM AND HUMIC SUBSTANCE REMOVING METHOD

TECHNICAL FIELD

The present invention relates to a river water utilizing flue gas desulfurization system and a humic substance removing method that remove humic substances contained in river water.

BACKGROUND ART

A desulfurization apparatus has been installed in a factory, a power plant, or the like to reduce sulfur content, such as sulfur oxide ($SO_X$), contained in flue gas generated by combusting fossil fuel such as coal. Furthermore, from a viewpoint of reducing the operation cost for desulfurization, facilities such as a power plant adopt a method in which river water, sea water, or the like is utilized as an absorbent that is used for reducing sulfur oxide contained in flue gas (for example, see Patent Document 1).

In addition, to reduce costs, river water or sea water is used not only as an absorbent in the desulfurization apparatus, but also as makeup water for diluting the absorbent used in the desulfurization apparatus. FIG. 6 depicts an example of a gas purification system using river water as makeup water. As shown in FIG. 6, a gas purification system 100 includes: a sedimentation pound 104 that removes sediment and bulky materials 103 contained in river water 102 that is pumped up from a river 101; a screen 106 that removes plants 105; and a desulfurization apparatus 109 that brings sulfur oxide ($SO_X$) contained in flue gas 107 into a gas-liquid contact with limestone gypsum slurry 108 to reduce $SO_X$.

In the gas purification system 100, the river water 102 is pumped up by way of a pump 110, the sediment and bulky materials 103 are removed in the sedimentation pound 104. The plants 105 are then removed at the screen 106 to obtain makeup water 111. The obtained makeup water 111 is supplied to the bottom of an apparatus body 112. The makeup water 111 may be directly supplied to the bottom of the apparatus body 112; or the makeup water 111 may be used as limestone slurry by dissolving limestone therein, or as seal water for various apparatus, as well as makeup water for the desulfurization apparatus 109.

The limestone gypsum slurry 108 supplied to the apparatus body 112 is jet out of hydraulic nozzles 113 toward the top of the apparatus body 112, and is brought in gas-liquid contact with the flue gas 107 that is introduced from the wall side of the apparatus body 112, in the manner facing thereto. The limestone gypsum slurry 108 used for desulfurization of the flue gas 107 is formulated by mixing limestone slurry $CaCO_3$ that is obtained by dissolving limestone powder in the makeup water 111, gypsum slurry $CaSO_4$ that is obtained by reacting limestone with $SO_X$ contained in the flue gas 107 and then further oxidizing the resultant product, and water. For the limestone gypsum slurry 108, for example, liquid that is deposited in the bottom of the apparatus body 112 in the desulfurization apparatus 109 and is pumped up is used. $SO_X$ contained in the flue gas 107 reacts with the limestone gypsum slurry 108 in the apparatus body 112 in the manner shown in the following formula (1):

$$CaCO_3 + SO_2 + 0.5H_2O \rightarrow CaSO_3 \cdot 0.5H_2O + CO_2 \quad (1)$$

The limestone gypsum slurry 108, containing $SO_X$ from the flue gas 107, is deposited in the bottom of the apparatus body 112, and mixed with the makeup water 111 and air 114, supplied to the bottom of the apparatus body 112, in the bottom of the apparatus body 112. In this process, the limestone gypsum slurry 108 flowed down in the apparatus body 112 reacts with the makeup water 111 and the air 114 in the manner shown in the following formula (2):

$$CaSO_3 \cdot 0.5H_2O + 0.5O_2 + 1.5H_2O \rightarrow CaSO_4 \cdot 2H_2O \quad (2)$$

The flue gas 107 is purified, and released out from the top of the apparatus body 112 as purified gas 115. Liquid mixture 116 of the makeup water 111 and the limestone gypsum slurry 108 supplied into the desulfurization apparatus 109 is ejected out of the desulfurization apparatus 109, oxidized, and discarded as gypsum slurry into a pond 117, for example. The liquid mixture 116 is dehydrated and ejected out of the system as dehydrated cake (gypsum). The filtrate after dehydration (dehydrated filtrate) is subjected to waste water treatments, such as removal of suspended solids contained therein, pH adjustment, or removal of heavy metals contained therein. A part of the dehydrated filtrate is returned to the desulfurization apparatus 109, and the remaining dehydrated filtrate is treated as waste water.

In this manner, the gas purification system 100 ejects the limestone gypsum slurry 108 used in desulfurization performed by utilizing the river water 102 as the makeup water 111.

PRIOR ART DOCUMENT

Patent Document

Patent Document 1: Japanese Patent Application Laid-open No. H03-52623

DISCLOSURE OF INVENTION

Problem to be Solved by the Invention

The river water 102 contains many impurities such as humic substances. Humic substances are present in places such as soil, rivers, lakes, groundwater, sea water, or geological sediments, and have a reduction effect. Therefore, when humic substances are present in the river water 102 upon oxidizing $SO_X$ contained in the limestone gypsum slurry 108 used for desulfurization, the humic substances may inhibit oxidization of $SO_X$ contained in the limestone gypsum slurry 108.

Furthermore, even if the humic substances contained in the makeup water 111 are oxidized or solid-liquid separated before supplying the river water 102 to the desulfurization apparatus 109 as the makeup water 111, the humic substances may become deposited in the apparatus body 112. The remaining humic substances can contaminate the limestone gypsum slurry 108 used for desulfurization.

Therefore, it has been desired to realize a method for removing humic substances contained in the river water 102 before supplying the makeup water 111 to the desulfurization apparatus 109, and suppressing the humic substances from inhibiting oxidation of the limestone gypsum slurry 108 used for desulfurization.

The present invention is made in consideration of the above, and an object of the present invention is to provide a river water utilizing flue gas desulfurization system and a humic substance removing method that allow river water to be used as makeup water without being impacted by humic substances contained therein.

Means for Solving Problem

According to an aspect of the present invention, a river water utilizing flue gas desulfurization system includes: a pre-treatment facility that removes humic substances contained in river water to produce makeup water; and a desulfurization apparatus that brings sulfur content in flue gas into contact with water to wash out the sulfur content in an apparatus body. The pre-treatment facility includes any one of a flocculant mixing basin in which a flocculant is added to the river water to flocculate and remove the humic substances contained in the river water, and an activated carbon absorption unit that allows activated carbon to absorb and remove the humic substances contained in the river water, or both of them.

Advantageously, the river water utilizing flue gas desulfurization system further includes a first concentration measuring unit arranged upstream of the pre-treatment facility to measure a concentration of the humic substances in the river water.

Advantageously, the river water utilizing flue gas desulfurization system further includes a second concentration measuring unit arranged downstream of the pre-treatment facility to measure a concentration of the humic substances remaining in the makeup water.

Advantageously, in the river water utilizing flue gas desulfurization system, when the pre-treatment facility includes the flocculant mixing basin, the first concentration measuring unit obtains the concentration of the humic substances in the river water; and the flocculant is added to the river water based on a predetermined relationship between the concentration of the humic substances in the river water and an amount of the flocculant required to be added to remove the humic substances from the river water.

Advantageously, in the river water utilizing flue gas desulfurization system, the first concentration measuring unit measures any one of a total organic carbon in and an absorbance of the river water or both of them, and the flocculant is added to the river water based on a predetermined relationship between the total organic carbon in and the absorbance of the river water, and the amount of the flocculant required to be added to remove the humic substances from the river water.

Advantageously, in the river water utilizing flue gas desulfurization system, the second concentration measuring unit measures the concentration of the humic substances in the makeup water; and an amount of the flocculant to be added to the river water is adjusted based on a predetermined relationship between the concentration of the humic substances in the river water and the amount of the flocculant required to be added to remove the humic substances from the river water.

Advantageously, in the river water utilizing flue gas desulfurization system, the second concentration measuring unit measures any one of a total organic carbon in and an absorbance of the makeup water or both of them, and the amount of the flocculant to be added to the river water is adjusted based on a predetermined relationship between the total organic carbon in, the absorbance of, and pH of the river water, and the amount of the flocculant required to be added to remove the humic substances from the river water.

Advantageously, the river water utilizing flue gas desulfurization system, when the pre-treatment facility includes the activated carbon absorption unit, further includes: a first pressure measuring unit that measures a pressure of the river water supplied to the activated carbon absorption unit; and a second pressure measuring unit that measures a pressure of the river water ejected out of the activated carbon absorption unit.

Advantageously, in the river water utilizing flue gas desulfurization system, an iron-based flocculant is used as the flocculant.

Advantageously, in the river water utilizing flue gas desulfurization system, the humic substances are any one of humic acid and fulvic acid or both of them.

According to another aspect of the present invention, a humic substance removing method includes: a first step of measuring a concentration of humic substances in river water; a step of flocculating and removing the humic substances in and from the river water by adding a flocculant to the river water; and a step of absorbing and removing the humic substances in and from the river water by way of activated carbon. The concentration of the humic substances in the river water is measured at the first step of measuring; and the flocculant is added to the river water based on a predetermined relationship between the concentration of the humic substances in the river water and an amount of the flocculant required to be added to remove the humic substances from the river water at the step of flocculating and removing.

Advantageously, in the humic substance removing method, any one of a total organic carbon in and an absorbance of the river water or both of them is measured at the first step of measuring, and the flocculant is added to the river water based on a predetermined relationship between the total organic carbon in and the absorbance of the river water, and the amount of the flocculant required to be added to remove the humic substances from the river water at the step of flocculating and removing.

Advantageously, the humic substance removing method further includes: a second step of measuring a concentration of the humic substances remaining in makeup water that is the river water having the humic substances removed therefrom. The concentration of the humic substances in the makeup water is measured at the second step of measuring, and the amount of the flocculant to be added to the river water is adjusted based on the predetermined relationship between the concentration of the humic substances in the river water and the amount of the flocculant required to be added to remove the humic substances from the river water at the step of flocculating and removing.

Advantageously, in the humic substance removing method, any one of a total organic carbon in and an absorbance of the makeup water or both of them is measured at the second step of measuring, and the amount of the flocculant to be added to the river water is adjusted based on a predetermined relationship between the total organic carbon in and the absorbance of the river water, and the amount of the flocculant required to be added to remove the humic substances from the river water at the step of flocculating and removing.

Advantageously, in the humic substance removing method, an iron-based flocculant is used as the flocculant.

Advantageously, in the humic substance removing method, the humic substances are any one of humic acid and fulvic acid or both of them.

Effect of the Invention

According to the present invention, because the humic substance contained in the river water is removed before supplying the river water to the desulfurization apparatus as the makeup water, it is possible to suppress the humic substance from inhibiting oxidization of $SO_X$ contained in the water used for desulfurization.

BEST MODE(S) FOR CARRYING OUT THE INVENTION

The present invention will now be explained in detail with reference to the attached drawings. An embodiment disclosed herein is not intended to limit the scope of the present invention in any way. Elements disclosed in the embodiment include those that can be easily imagined by those in the art, or those that are substantially identical.

Embodiment

A river water utilizing flue gas desulfurization system according to an embodiment of the present invention will now be explained with reference to the drawings.

Figure 1:
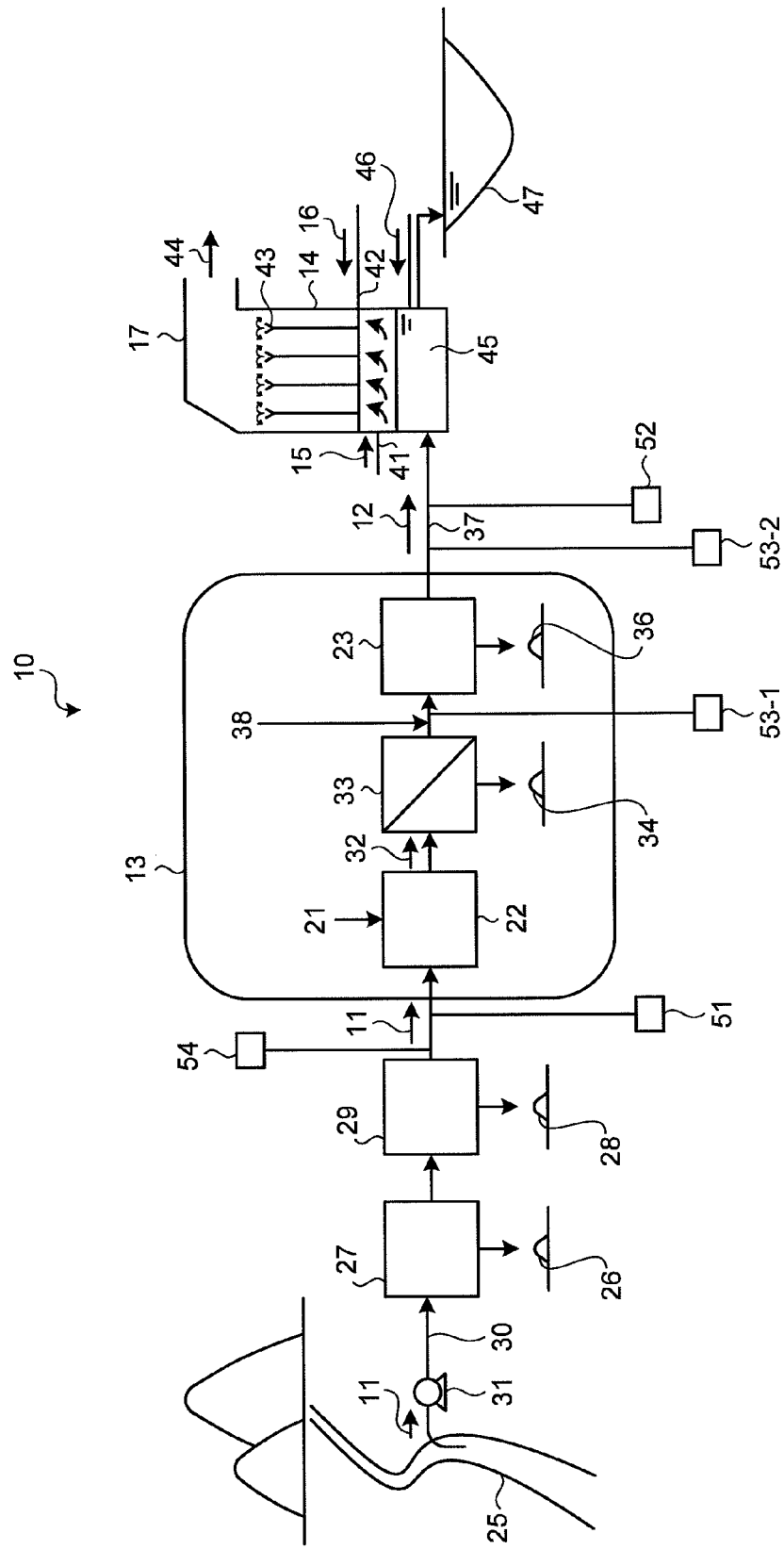
FIG. 1 is a schematic of a river water utilizing flue gas desulfurization system according to an embodiment of the present invention.

FIG. 1 is a schematic of the river water utilizing flue gas desulfurization system according to the embodiment of the present invention.

As shown in FIG. 1, a river water utilizing flue gas desulfurization system 10 according to the embodiment includes: a pre-treatment facility 13 that removes the humic substances contained in river water 11 to produce makeup water 12; and a desulfurization apparatus 17 that brings sulfur content in flue gas 15 into contact with limestone gypsum slurry 16 in an apparatus body 14 to wash out the sulfur content. The pre-treatment facility 13 includes a flocculant mixing basin 22 in which a flocculant 21 is added to the river water 11 to remove the humic substances from the river water 11, and an activated carbon absorption unit 23 that allows activated carbon to absorb and remove the humic substances contained in the river water 11.

Humic substances are substances such as organic substances that are present in the nature, including soil, river water, lake water, groundwater, sea water, or geological sediments. Humic substances contain natural macromolecular organic substances produced by decomposition performed by lignin or the like, present in plants grown in, for example, a meadow or a forest. Examples of the natural macromolecular organic substances include humic acid or fulvic acid. Humic substances have a reduction effect.

In the present invention, the humic substances mean substances such as organic substances that are contained in natural water, such as river water or lake water.

Between river 25 and the pre-treatment facility 13, a sedimentation pound 27 that removes sediments and bulky materials 26 from the river water 11 and a screen 29 that removes plants 28 are arranged. Before supplying the river water 11 into the pre-treatment facility 13, large materials, contained in the river water 11, are at first removed. A pump 31 extracts the river water 11 from the river 25 via a river water extracting line 30, and the river water 11 is supplied to the sedimentation pound 27. The sedimentation pound 27 removes the sediments and bulky materials 26 from the river water 11, and the screen 29 removes the plants 28 therefrom. The river water 11 is then supplied to the pre-treatment facility 13.

In the pre-treatment facility 13, the flocculant mixing basin 22 and the activated carbon absorption unit 23 are arranged in the direction in which the river water 11 is supplied. The river water 11 is supplied to the flocculant mixing basin 22, and the flocculant 21 is added to the river water 11 in the flocculant mixing basin 22. By adding the flocculant 21 to the river water 11, the humic substances in the river water 11 can be flocculated.

The flocculant 21 causes the humic substances in the river water 11, for example, to stick together to form a flock (mass), to allow the humic substances to be separated and removed from the river water 11 easily by way of sedimentation and filtration. Either an inorganic or organic flocculant may be used as the flocculant 21. Examples of the inorganic flocculant include iron-based flocculants such as ferric chloride ($FeCl_3$), ferrous sulfate, poly-ferric sulfate, or polysilicate iron; and aluminum-based flocculants such as polyaluminum chloride or aluminum sulfate. Examples of the organic flocculant includes: anionic polymer flocculants such as those based on polyacrylamide or polyacrylate soda; cationic polymer flocculants such as those based on polyacrylamide, polyacrylic esters, polymethacrylic acid esters, polyamines, or polydicyandiamide; nonionic polymer flocculants such as those based on polyacrylamide, or polyethylene-oxide; and amphoteric polymer flocculants such as those based on dimethylaminoethyl acrylate. However, the inorganic and organic flocculants are not limited to those mentioned herein. An iron-based flocculant is preferably used as the flocculant 21, because an iron-based flocculant indicates high oxidization performance during the desulfurization, while a polymer flocculant is high in costs and difficult to handle, and an aluminum-based flocculant, which is another type of inorganic flocculants, gives a negative impact to the desulfurization performance. Especially, amongst the iron-based flocculants, it is preferable to select $FeCl_3$, because $FeCl_3$ is low in price, and has high flocculation performance. More than two selected out of the inorganic and the organic flocculants may be used in combination as the flocculant.

(Relationship between Iron-Based Flocculants and Humic Substance Reduction Ratios)

A humic substance reduction ratio achieved when an iron-based flocculant is used as the flocculant 21 will now be explained.

Figure 2:
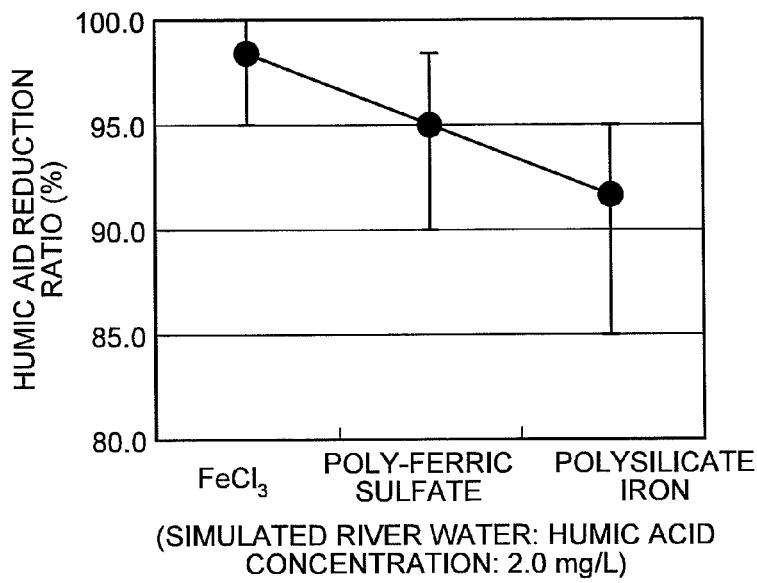
FIG. 2 is a graph of a relationship between iron-based flocculants and humic substance reduction ratios.

FIG. 2 is a graph of a relationship between the iron-based flocculants and humic substance reduction ratios. $FeCl_3$, poly-ferric sulfate, and polysilicate iron are used as the iron-based flocculants.

A simulation is conducted using humic acid as the humic substance; humic acid is added to distilled water to achieve the humic acid concentration of 2.0 mg/L; and the simulation liquid is used as simulated river water.

As shown in FIG. 2, amongst the iron-based flocculants, the humic acid reduction ratio of $FeCl_3$ is higher than that of poly-ferric sulfate or polysilicate iron. Because $FeCl_3$ indicates higher humic acid flocculation performance than that of poly-ferric sulfate or polysilicate iron, it is most preferable to use $FeCl_3$ when an iron-based flocculant is used as the flocculant 21.

In FIG. 2, the range of the humic acid reduction ratio of each of the iron-based flocculants, $FeCl_3$, poly-ferric sulfate, and the polysilicate iron, is the result of simulation conducted with the simulation liquid having pH range equal to or higher than 5 and equal to or lower than 9. This is because it is preferable to set pH of the river water 11 between equal to or higher than 5 and equal to or lower than 7, to allow the flocculant 21 to react with the river water 11 in an optimal manner, as will be described later.

The simulation is conducted using humic acid as the humic substance; however, also with fulvic acid, high fulvic acid removing performance is obtained as well. Furthermore, when a simulation is conducted with a simulation liquid containing humic acid and fulvic acid as the humic substances, high fulvic acid removing performance is achieved in a similar manner.

The amount of the flocculant 21 added is preferably between equal to or more than 2.0 mg/L and equal to or less than 50 mg/L, depending on the concentration of the humic substances in the river water 11 to be supplied. This is because, if the flocculant 21 is added in the amount less than 2.0 mg/L, a sufficient flocculation effect cannot be achieved, and if the flocculant 21 is added in the amount more than 50 mg/L, another issue may occur, such as coloring of water.

The concentration of the flocculant 21 itself to be added is preferably a few or a few-ten percent (weight basis) thereof.

From the viewpoint of flocculation performance, to allow the flocculant 21 to react with the river water 11 in an optimal manner, pH of the river water 11 is preferably within a range between equal to or higher than 5 and equal to or lower than 7, and more preferably within a range between equal to or higher than 5.5 and equal to or lower than 6.5 at the time of flocculation reaction. This is because, if pH of the river water 11 is lower than 5, the flocculation performance deteriorates. This is also because, if pH of the river water 11 is higher than 7, the flocculation performance deteriorates as well. Furthermore, acid or alkali may be added to the river water 11 based on measured pH of the river water 11 to maintain pH of the river water 11 at an optimal level.

As shown in FIG. 1, flocculated liquid 32 that is the river water 11 to which the flocculant 21 is added in the flocculant mixing basin 22 is ejected to the activated carbon absorption unit 23.

The pre-treatment facility 13 includes a sand filter 33 that is arranged between the flocculant mixing basin 22 and the activated carbon absorption unit 23 to remove flocculated substances, formed by adding the flocculant 21 to the river water 11, as flocculated sludge. The sand filter 33 uses sand, gravels, or the like as a filtering medium. The sand filter 33 includes a filtering basin, for example, filled with sand or gravels that are a filtering medium, and having an inlet on top thereof for pouring the flocculated liquid 32, and an outlet on the bottom thereof. The sand filter 33 removes the flocculated substances, formed by adding the flocculant 21 to the river water 11 in the flocculant mixing basin 22, as flocculated sludge 34. After the sand filter 33 removes the flocculated substances from the flocculated liquid 32, the flocculated liquid 32 is supplied to the activated carbon absorption unit 23.

The activated carbon absorption unit 23 provides activated carbon treatment to the flocculated liquid 32. The activated carbon treatment is treatment in which granular activated carbon is brought in contact with the flocculated liquid 32 to allow the activated carbon to absorb and remove the humic substances contained in the flocculated liquid 32. A multi-fluidized bed activated carbon absorption unit, a fixed-bed activated carbon absorption unit, and like can be used as the activated carbon absorption unit 23; however, from the perspectives of operation management and absorbing capability, for example, it is preferable to use a multi-fluidized bed activated carbon absorption unit.

There is no limitation to activated carbon to be used, and either powdered or granular activated carbons may be used. Activated carbon is carbon that is made from a carbonic substance such as coal or a palm shell as a raw material, and has microscopic pores (e.g., a diameter of 10 to 200 angstroms) that are formed by way of a reaction with gas or a chemical at a high temperature. Examples of activated carbon include, depending on the type of a raw material, coal-based activated carbon using coal as the raw material of the carbonic substance; palm-shell-based activated carbon using palm shells as the raw material of the carbonic substance; and synthetic-resin-based activated carbon and fibrous activated carbon using synthetic carbon as the raw material of the carbonic substance. The humic substance absorption capacity differs depending on the type of the carbonic substance used as a raw material, and it is preferable to use coal-based activated carbon as the activated carbon.

(Impact of Type of Activated Carbon to Humic Substance Absorption Capacity)

It will be now explained how the humic substance absorption capacity is influenced when the coal-based activated carbon and the palm-shell-based activated carbon are used as the activated carbon. A simulation is conducted using humic acid as the humic substance; and humic acid is added to distilled water and adjusted to obtain a simulation liquid with an initial humic acid concentration of 1.9 ppm; and the simulation liquid is used as the simulated river water.

Figure 3:
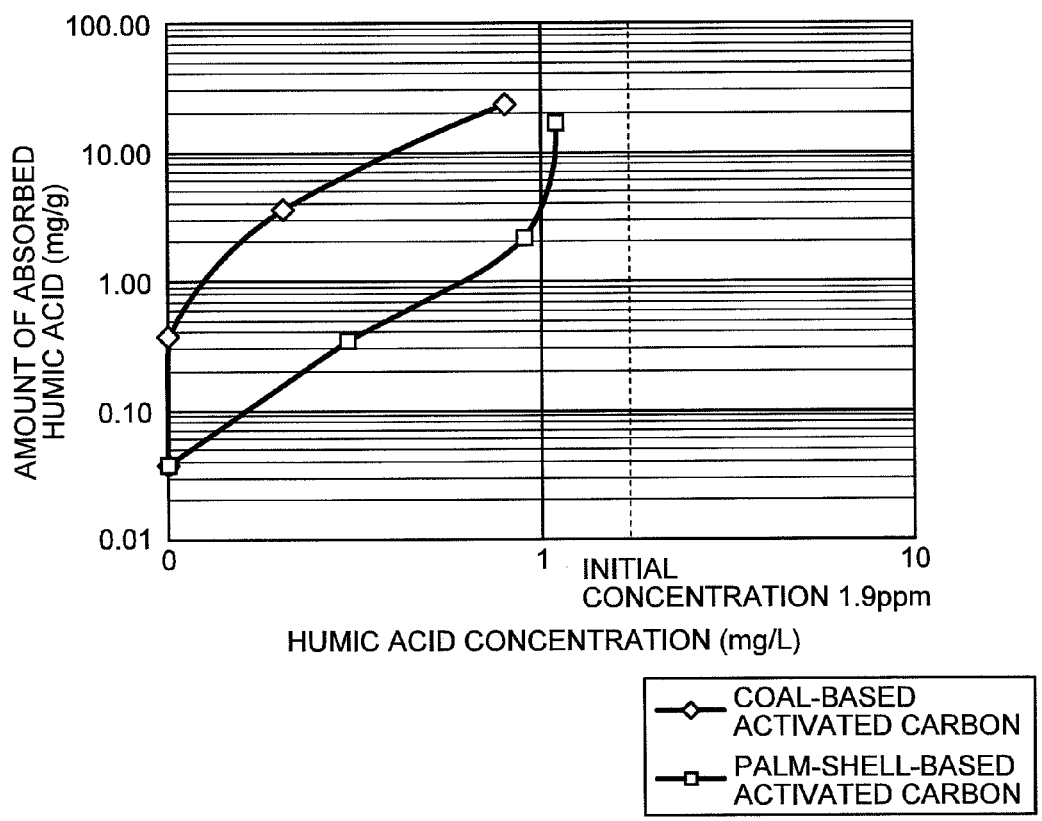
FIG. 3 is a graph of a relationship between humic acid concentrations and humic acid absorption capacities.

FIG. 3 is a graph of a relationship between the humic acid concentrations and the humic acid absorption capacities.

As shown FIG. 3, because the coal-based activated carbon absorbs more humic acid than that of the palm-shell-based activated carbon, a higher humic acid removing efficiency can be achieved when the coal-based activated carbon is used, in comparison with when the palm-shell-based activated carbon is used.

The simulation is conducted using humic acid as the humic substance; however, also with fulvic acid, the use of coal-based activated carbon makes fulvic acid removing efficiency higher than that achieved with the palm-shell-based activated carbon. Furthermore, when a simulation is conducted with a simulation liquid containing humic acid and fulvic acid as the humic substances, the use of coal-based activated carbon makes humic acid and fulvic acid removing performance higher in a similar manner than that achieved with palm-shell-based activated carbon.

As shown in FIG. 1, after the humic substances remaining in the river water 11 are absorbed by the activated carbon, the activated carbon absorption unit 23 ejects the activated carbon as spent activated carbon 36. The river water 11 having the humic substances removed therefrom in the activated carbon absorption unit 23 is then ejected via a makeup water supplying line 37 as the makeup water 12, and supplied to the desulfurization apparatus 17.

As described above, before supplying the river water 11 to the desulfurization apparatus 17, in the pre-treatment facility 13, the flocculant mixing basin 22 flocculates and removes the humic substances contained in the river water 11; the sand filter 33 removes remaining solid substances; and the activated carbon absorption unit 23 allows the activated carbon to absorb the humic substances remaining in the river water 11. In this manner, the river water 11 having the humic substances removed therefrom can be supplied to the desulfurization apparatus 17 as the makeup water 12.

Furthermore, industrial water 38 may be supplied to the activated carbon absorption unit 23 instead of the flocculated liquid 32 to allow the activated carbon to absorb the humic substances contained in the industrial water 38, and supplied to the desulfurization apparatus 17 as the makeup water 12.

In the desulfurization apparatus 17, the flue gas 15 is supplied to the apparatus body 14 through the wall thereof via a flue gas supplying line 41 at the bottom thereof. The limestone gypsum slurry 16, supplied via a water supplying line 42, is jet out of nozzles 43 arranged in the apparatus body 14 toward the top of the desulfurization apparatus 17. The flue gas 15 rising from the bottom of the apparatus body 14 is brought in a liquid-gas contact with the limestone gypsum slurry 16 that is jet out of the nozzles 43 and flowing down to allow the limestone gypsum slurry 16, in the manner faces thereto, to absorb and recover sulfur oxide ($SO_X$) contained in the flue gas 15. The flue gas 15 purified by the limestone gypsum slurry 16 is released out from the top of the desulfurization apparatus 17 as purified gas 44. The limestone gypsum slurry 16 used for desulfurization of the flue gas 15 is prepared by mixing limestone slurry $CaCO_3$ that is obtained by dissolving limestone powder in the makeup water 12, gypsum slurry $CaSO_4$ that is obtained by reacting limestone with $SO_X$ contained in the flue gas 15 and then further oxidizing the resultant product, and water. For the limestone gypsum slurry 16, a liquid mixture 45 deposited in and pumped up from the bottom of the apparatus body 14 of the desulfurization apparatus 17 is used, for example. The $SO_X$ contained in the flue gas 15 reacts with the limestone gypsum slurry 16 as expressed in the following formula (1) in the apparatus body 14:

$$CaCO_3 + SO_2 + 0.5H_2O \rightarrow CaSO_3 \cdot 0.5H_2O + CO_2 \quad (1)$$

The limestone gypsum slurry 16 that has absorbed $SO_X$ contained in the flue gas 15 is then mixed with the makeup water 12 at the bottom of the desulfurization apparatus 17. The liquid mixture 45 of the makeup water 12 and the limestone gypsum slurry 16 is oxidized by air 46 supplied to the bottom of the apparatus body 14. At this time, the limestone gypsum slurry 16 that has flowed down in the apparatus body 14 reacts with the makeup water 12 and the air 46 in the manner expressed by the following formula (2):

$$CaSO_3 \cdot 0.5H_2O + 0.5O_2 + 1.5H_2O \rightarrow CaSO_4 \cdot 2H_2O \quad (2)$$

After being oxidized, the liquid mixture 45 is ejected out of the desulfurization apparatus 17, and is discarded into a pond 47, for example, as gypsum slurry. The liquid mixture 45 is dehydrated and ejected out of the system as dehydrated cake (gypsum). The filtrate after dehydration (dehydrated filtrate) is subjected to waste water treatments, such as removal of suspended solids contained therein, pH adjustment, or removal of heavy metals contained therein. A part of the dehydrated filtrate is returned to the desulfurization apparatus 17, and the remaining dehydrated filtrate is treated as waste water.

In this manner, the makeup water 12 can be supplied to the desulfurization apparatus 17 after removing the humic substances contained in the river water 11. Therefore, upon oxidizing $SO_X$ contained in the limestone gypsum slurry 16 that is used for the desulfurization in the desulfurization apparatus 17, it is possible to prevent the oxidization of $SO_X$ contained in the limestone gypsum slurry 16 from being inhibited.

A first concentration measuring unit 51 is arranged upstream of the pre-treatment facility 13 to measure the concentration of the humic substances in the river water 11. More specifically, the first concentration measuring unit 51 is arranged between the screen 29 and the flocculant mixing basin 22. The first concentration measuring unit 51 measures the concentration of the humic substances contained in the river water 11, and the flocculant 21 is added to the river water 11 based on a predetermined relationship between a concentration of the humic substances in the river water and an amount of the flocculant required to be added to remove the humic substances from the river water. For example, a schematic is prepared in advance to indicate the relationship between the concentration of the humic substances in the river water and the amount of the flocculant required to be added to remove the humic substances from the river water. By preparing a schematic representing the relationship between the concentration of the humic substances in the river water and the amount of the flocculant required to be added to remove the humic substances from the river water in advance, and by allowing the first concentration measuring unit 51 to measure the concentration of the humic substances in the river water 11, the amount of the flocculant 21 to be added in the flocculant mixing basin 22 can be adjusted.

The first concentration measuring unit 51 obtains the concentration of the humic substances in the river water 11 based on the total organic carbon (TOC) in and the absorbance of the river water 11. For example, a schematic is prepared in advance to indicate a relationship between the TOC in and the absorbance of the river water measured by the first concentration measuring unit 51, and the amount of the flocculant required to be added to remove the humic substances from the river water. The first concentration measuring unit 51 includes a total organic carbon meter (TOC meter) that measures the TOC in the river water 11, and an absorbance meter that measures the absorbance thereof, to measure the total organic carbon (TOC) in and the absorbance of the river water 11. The higher the concentration of the humic substances in the river water 11 is, the higher the TOC will be, and the stronger value the measured absorbance wavelength will indicate. The absorbance wavelength measured is preferably equal to or higher than 260 nanometers and equal to or lower than 280 nanometers. It is also preferable to measure pH of the river water 11, in addition to the TOC in and the absorbance of the river water 11. This is because, it is preferable to bring pH of the river water 11 within the range between equal to or higher than 5 and equal to or lower than 7, from the viewpoint of the flocculation performance.

By allowing the first concentration measuring unit 51 to measure the TOC in and the absorbance of the river water 11, the concentration of the humic substances in the river water 11 can be obtained based on the predetermined relationship between the TOC in and the absorbance of the river water, and the amount of the flocculant required to be added to remove the humic substances from the river water, and the flocculant 21 can be added to the river water 11 in the flocculant mixing basin 22 depending on the obtained concentration of the humic substances in the river water 11.

In the description above, the first concentration measuring unit 51 measures both of the TOC in and the absorbance of the river water 11; however, the present invention is not limited thereto, and the first concentration measuring unit 51 may also measure only one of the TOC in and the absorbance of the river water 11 to obtain the concentration of the humic substances in the river water 11.

A second concentration measuring unit 52 is arranged downstream of the pre-treatment facility 13 to measure the concentration of the humic substances remaining in the makeup water 12. More specifically, the second concentration measuring unit 52 is arranged downstream of the activated carbon absorption unit 23, and between the activated carbon absorption unit 23 and the desulfurization apparatus 17. A schematic, for example, is prepared in advance to indicate the relationship between the concentration of the humic substances in the river water and the amount of the flocculant required to be added to remove the humic substances from the river water, based on the relationship between the concentration of the humic substances in the makeup water 12 measured by the second concentration measuring unit 52, and the amount of the flocculant required to be added to remove the humic substances from the river water. By allowing the second concentration measuring unit 52 to measure the concentration of the humic substances in the makeup water 12, it is possible to adjust the amount of the flocculant 21 to be added to the river water 11 that is newly supplied, based on the predetermined relationship between the concentration of the humic substances in the river water and the amount of the flocculant required to be added to remove the humic substances from the river water.

The second concentration measuring unit 52 measures TOC in and absorbance of the makeup water 12. The second concentration measuring unit 52 also obtains the concentration of the humic substances in the makeup water 12 based on the TOC in and the absorbance of the makeup water 12. A schematic, for example, is prepared in advance to indicate the relationship between the TOC in and the absorbance of the river water measured by the second concentration measuring unit 52, and the amount of the flocculant required to be added to remove the humic substances from the river water. The second concentration measuring unit 52 includes a TOC meter for measuring the TOC in the river water 11 and an absorbance meter for measuring the absorbance thereof, in the same manner as the first concentration measuring unit 51, to measure the TOC in and the absorbance of the river water 11. The relationship between the TOC measured and the strength of absorbance wavelength, and the concentration of the humic substances in the makeup water 12 is the same as that in the first concentration measuring unit 51. In other words, the higher the concentration of the humic substances in the river water 11 is, the higher the TOC will be, and stronger value the measured absorbance wavelength will indicate.

By allowing the second concentration measuring unit 52 to measure the TOC in and the absorbance of the makeup water 12, it is possible to obtain the concentration of the humic substances in the makeup water 12 based on the predetermined relationship between the TOC in and absorbance of the river water, and the amount of the flocculant required to be added to remove the humic substances from the river water, and to adjust the amount of the flocculant 21 to be added to the river water 11 that is newly supplied in the flocculant mixing basin 22, based on the obtained concentration of the humic substances in the makeup water 12.

Furthermore, because the humic substances remaining in the flocculated liquid 32 supplied to the activated carbon absorption unit 23 that are ejected out in the makeup water 12 without being sufficiently absorbed and removed by the activated carbon can be found out, the humic substance absorption performance of the activated carbon arranged in the activated carbon absorption unit 23 can be assessed.

Moreover, in the description above, the second concentration measuring unit 52 also measures both of the TOC in and the absorbance of the makeup water 12, in the same manner as the first concentration measuring unit 51; however, the present invention is not limited thereto, and the second concentration measuring unit 52 may also measure only one of the TOC in or the absorbance of the makeup water 12, to measure the concentration of the humic substances in the makeup water 12.

A first pressure measuring unit 53-1 is arranged upstream of the activated carbon absorption unit 23 to measure the pressure of the flocculated liquid 32; and a second pressure measuring unit 53-2 is arranged downstream of the activated carbon absorption unit 23 to measure the pressure of the makeup water 12 ejected out of the activated carbon absorption unit 23. The pressure of the flocculated liquid 32 and the pressure of the makeup water 12 are measured respectively by the first pressure measuring unit 53-1 and the second pressure measuring unit 53-2 to obtain the difference between the pressure of the flocculated liquid 32 and that of the makeup water 12. As a result of this, sealing level of the activated carbon absorption unit 23, as well as the humic substance absorption performance of the activated carbon, can be assessed.

The river water utilizing flue gas desulfurization system 10 according to the present embodiment includes the second concentration measuring unit 52, the first pressure measuring unit 53-1, and the second pressure measuring unit 53-2 to assess the humic substance absorption performance of the activated carbon; however, the present invention is not limited thereto, and only the second concentration measuring unit 52 may be included or only the first pressure measuring unit 53-1 and the second pressure measuring unit 53-2 may be included without including the second concentration measuring unit 52.

An oxidization speed measuring unit 54 is arranged upstream of the first concentration measuring unit 51 to measure the oxidization speed of the river water 11. The oxidization speed measuring unit 54 enables the oxidization speed of the river water 11 to be measured to allow the concentration of the humic substance in the river water 11 to be measured in advance. When it is not necessary to measure the oxidization speed of the river water 11, the oxidization speed measuring unit 54 may be omitted.

A controller (not shown) causes the first concentration measuring unit 51 to measure the concentration of the humic substances in the river water 11; the second concentration measuring unit 52 to measure the concentration of the humic substances in the makeup water 12; the first pressure measuring unit 53-1 to measure the pressure of the flocculated liquid 32; and the second pressure measuring unit 53-2 to measure the pressure of the makeup water 12. The controller (not shown) also controls the amount of the flocculant 21 to be added in the flocculant mixing basin 22.

(Oxidization Capacity Comparison Between Before and After Humic Substance Treatment)

It will be now explained a relationship between oxidization speed constants of the river water 11 before and after treating the humic substances, using a scenario where the humic substances are removed by adding the flocculant 21 to the river water 11, and a scenario where the humic substances are absorbed from the river water 11 by way of the activated carbon. Coal-based activated carbon was used as the activated carbon, and the humic acid contained in the river water 11 was treated as the humic substance.

Figure 4:
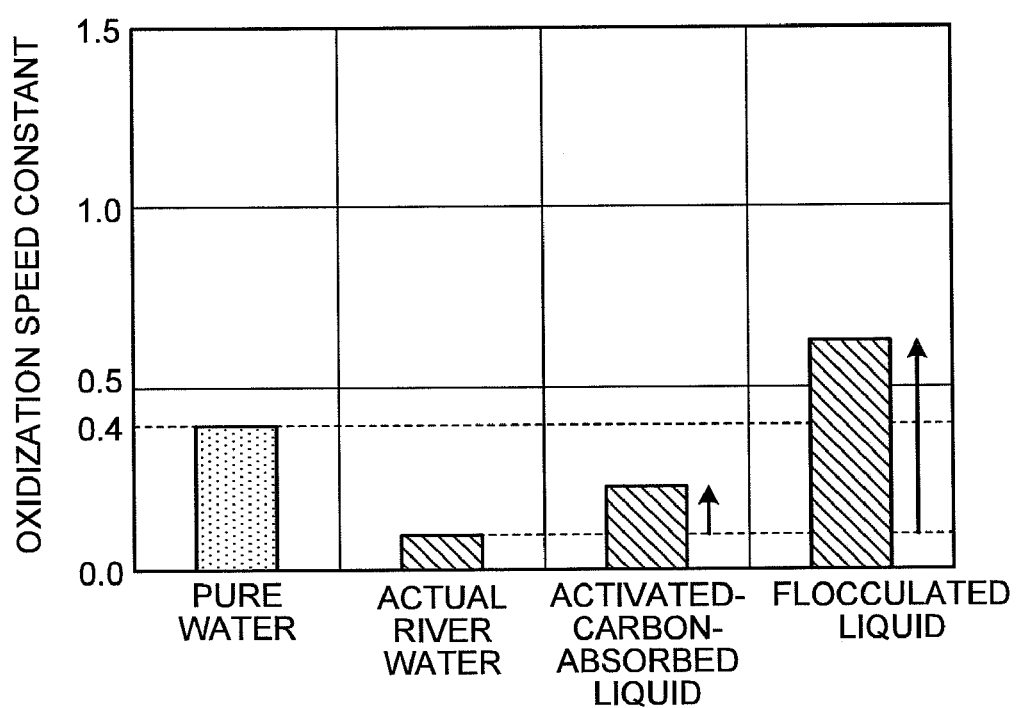
FIG. 4 is a graph of a relationship between oxidization speed constants of actual river water before and after treating humic acid.

FIG. 4 indicates a test result in which the oxidization speed is measured before and after the humic acid in actual river water (actual liquid) is treated. FIG. 4 is a graph of a relationship between the oxidization speed constants of the actual river water before and after treating the humic acid.

In FIG. 4, activated-carbon-absorbed liquid is liquid in which the humic acid concentration of the river water was set to be approximately 1.9 mg/L, and the humic acid contained in the river water was absorbed by way of the activated carbon.

In addition, flocculated liquid is liquid in which the humic acid concentration of the river water was set to be approximately 1.9 mg/L, and approximately 50 mg/L of $FeCl_3$ was added thereto as the flocculant to flocculate and remove the humic acid contained in the river water.

Ion-exchange water was used as pure water. The oxidization speed constant of the ion-exchanged water was approximately 0.4, thus the reference value of the oxidization speed constant was approximately 0.4.

As shown in FIG. 4, the oxidization speed constant was approximately 0.1 before adding $FeCl_3$ to the river water. By treating the humic acid contained in the river water with the activated carbon absorption, the oxidization speed constant increased to approximately 0.21. Furthermore, by adding approximately 50 mg/L of $FeCl_3$ to the river water, and flocculating and removing the humic acid contained in the river water by way of the flocculant, the oxidization speed constant increased to approximately 0.60.

In this manner, just by adding $FeCl_3$ to flocculate and remove the humic acid in the river water by way of the flocculant, the oxidization speed constant of the treated river water became higher than that of the pure water (0.4) that is the reference oxidization speed constant for the actual river water. Therefore, by further absorbing and removing the humic acid contained in the river water by way of the activated carbon, the oxidization speed constant of the river water having humic acid contained therein treated can be further increased.

The humic acid contained in the river water 11 was treated as the humic substance; however, the oxidization speed constant of the actual liquid can be increased as well when the fulvic acid is treated. In addition, the oxidization speed constant can also be increased when both of the humic acid and the fulvic acid contained in the river water 11 are treated as the humic substances.

By adding the flocculant 21 to flocculate and remove the humic acid contained in the river water 11, and by further allowing the activated carbon to absorb and remove the humic acid remaining in the river water 11, the oxidization speed constant of the makeup water 12 was further increased higher than the oxidization speed constant (0.4) of the pure water that is the reference oxidization speed constant for the actual river water. Therefore, it is confirmed that the river water utilizing flue gas desulfurization system 10 according to the present embodiment can be applied to the actual river water.

In this manner, in the river water utilizing flue gas desulfurization system 10 according to the present embodiment, before supplying the river water 11 as the makeup water 12 to the desulfurization apparatus 17, the flocculant 21 is added to the river water 11 in the flocculant mixing basin 22 included in the pre-treatment facility 13, and the river water 11 is treated with the activated carbon in the activated carbon absorption unit 23 to remove the humic substances contained in the river water 11. Therefore, it is possible to suppress the humic substances from inhibiting oxidation of $SO_X$ contained in the limestone gypsum slurry 16 used for desulfurization.

Figure 6:
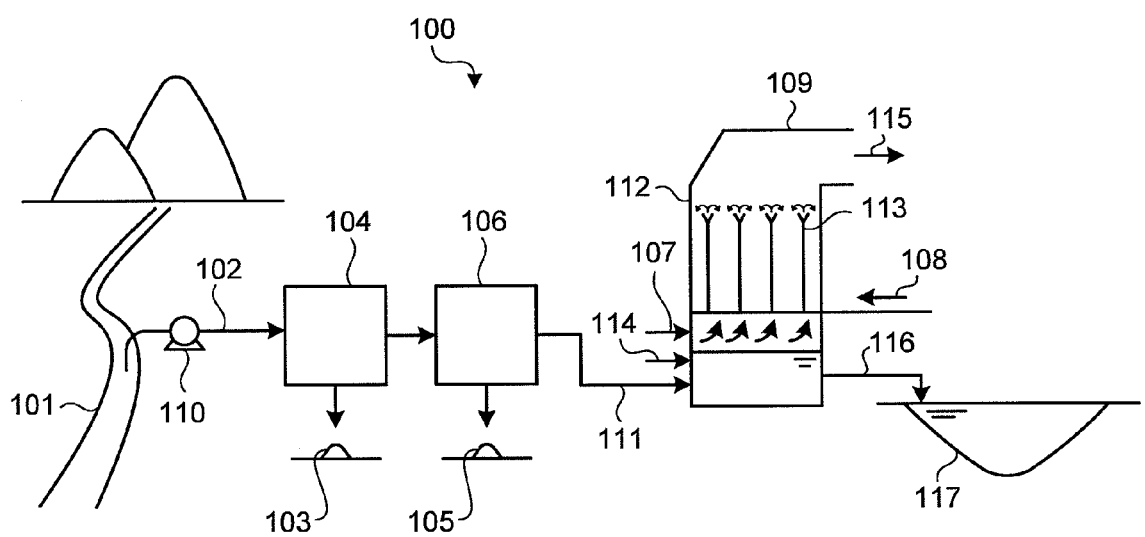
FIG. 6 is a schematic of an exemplary structure of a conventional gas purification system that uses river water as makeup water.

Because the amount of impurities contained in the river water 11 differs depending on environmental factors such as a season or a weather, the conventional gas purification system 100, such as one shown in FIG. 6, may not sufficiently treat impurities such as the humic substances contained in the river water 102 that is used as the makeup water 111. In contrast, in the river water utilizing flue gas desulfurization system 10 according to the present embodiment, even when the amount of the impurities contained in the river water 11 becomes different due to environmental factors such as a season or a weather, the amount of the flocculant 21 to be added to the river water 11 in the flocculant mixing basin 22 can be adjusted by allowing the second concentration measuring unit 52 to measure the concentration of the humic substances in the makeup water 12. Therefore, the makeup water 12 not containing the humic substances can be steadily supplied to the desulfurization apparatus 17.

(Controlling Amount of Flocculant to be Added)

Figure 5:
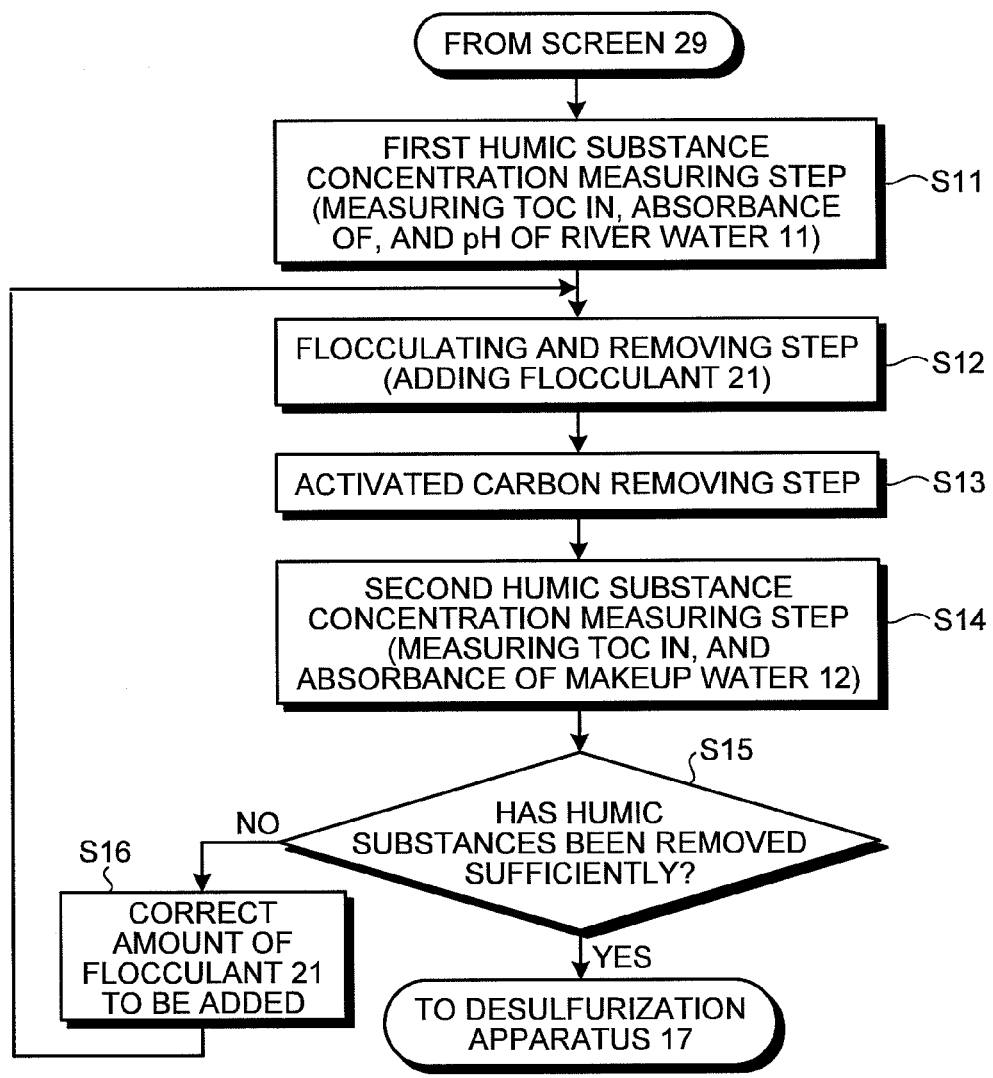
FIG. 5 is a schematic of an operation control of a pre-treatment facility included in the river water utilizing flue gas desulfurization system shown in FIG. 1.

FIG. 5 is a schematic of an operation control of the pre-treatment facility included in the river water utilizing flue gas desulfurization system shown in FIG. 1.

As shown in FIG. 5, a humic substance removing method using the river water utilizing flue gas desulfurization system 10 shown in FIG. 1 includes: a first humic substance concentration measuring step S11 in which the concentration of the humic substances contained in the river water 11 is measured; a flocculating and removing step S12 in which the flocculant 21 is added to the river water 11 to flocculate and remove the humic substances contained in the river water 11; an activated carbon removing step S13 in which the humic substances contained in the river water 11 are absorbed and removed by way of the activated carbon; and a second humic substance concentration measuring step S14 in which the concentration of the humic substances remaining in the makeup water 12, which is the river water 11 having humic substances are removed therefrom, is measured.

The first humic substance concentration measuring step S11, the flocculating and removing step S12, the activated carbon removing step S13, and the second humic substance concentration measuring step S14 respectively correspond to the first concentration measuring unit 51 shown in FIG. 1, the flocculant mixing basin 22 shown in FIG. 1, the activated carbon absorption unit 23 shown in FIG. 1, and the second concentration measuring unit 52 shown in FIG. 1.

The operations in each of the first humic substance concentration measuring step S11 to the second humic substance concentration measuring step S14 are performed by the controller (not shown).

(First Humic Substance Concentration Measuring Step S11)

At the first humic substance concentration measuring step S11, the concentration of the humic substances contained in the river water 11 ejected out of the screen 29 is measured. The concentration of the humic substances in the river water 11 is obtained based on the TOC in and the absorbance of the river water 11. More specifically, at the first humic substance concentration measuring step S11, the TOC in and the absorbance of the river water 11 are measured. A schematic, for example, is prepared in advance to indicate the relationship between the TOC in and the absorbance of the river water measured at the first humic substance concentration measuring step S11, and the amount of the flocculant required to be added to remove the humic substances from the river water. The amount of the flocculant 21 required to be added to remove the humic substances from the river water 11 is then determined based on the predetermined relationship between the TOC in and the absorbance of the river water, and the amount of the flocculant required to be added to remove the humic substances from the river water. To achieve advantageous flocculation performance at the flocculating and removing step S12, pH of the river water 11 is also measured at the first humic substance concentration measuring step S11. Based on the measured pH, acid or alkali is added to the river water 11 to adjust pH of the river water 11 to an optimal level, that is equal to or higher than 5 and equal to or lower than 7. Both of the TOC in and the absorbance of the river water 11 are measured herein; however, only one of the TOC in or the absorbance of the river water 11 may also be measured.

(Flocculating and Removing Step S12)

At the flocculating and removing step S12, the flocculant 21 is added to the river water 11 according to the amount of the flocculant 21 to be added determined at the first humic substance concentration measuring step S11, and the humic substances in the river water 11 is flocculated and removed.

The river water 11 having humic substances flocculated and removed therefrom by using the flocculant 21 is referred to as the flocculated liquid 32.

(Activated Carbon Removing Step S13)

At the activated carbon removing step S13, the humic substances in the flocculated liquid 32 are absorbed and removed by the activated carbon, to obtain the makeup water 12.

(Second Humic Substance Concentration Measuring Step S14)

At the second humic substance concentration measuring step S14, the concentration of the humic substances remaining in the makeup water 12, obtained by removing the humic substances in the river water 11, is measured. The concentration of the humic substances in the makeup water 12 is obtained based on the TOC in and the absorbance of the makeup water 12. More specifically, at the second humic substance concentration measuring step S14, the TOC in and the absorbance of the makeup water 12 are measured. A schematic, for example, is prepared in advance to indicate the relationship between the TOC in and the absorbance of the river water measured at the second humic substance concentration measuring step S14, and the amount of the flocculant required to be added to remove the humic substances from the river water. Based on the predetermined relationship between the TOC in and the absorbance of the river water, and the amount of the flocculant required to be added to remove the humic substances from the river water, the amount of the flocculant 21 to be added to the river water 11 that is newly supplied can be adjusted at the flocculating and removing step S12. Both of the TOC in and the absorbance of the makeup water 12 are measured herein; however, only one of the TOC in and the absorbance of the makeup water 12 may also be measured.

At Step S15, if it is determined that the makeup water 12 contains the humic substances and the humic substances are not sufficiently removed (NO at Step S15), it is determined that the amount of the added flocculant 21 is not sufficient, and the system control proceeds to Step S16.

At Step S16, the amount of the flocculant 21 to be added is adjusted based on the predetermined relationship between the TOC in and the absorbance of the river water, and the amount of the flocculant required to be added to remove the humic substances from the river water. At the flocculating and removing step S12, the flocculant 21 is added to the river water 11 in the amount thus adjusted.

At Step S15, if it determined that no humic substances are contained in the makeup water 12 (YES at Step S15), it is determined that the amount of the added flocculant 21 is sufficient, and the amount of the flocculant 21 to be added to the river water 11 at the flocculating and removing step S12 is kept as it is, and the flocculant 21 is added to the river water 11 that is newly supplied.

Therefore, by measuring the concentration of the humic substances in the makeup water 12 at the second humic substance concentration measuring step S14, if it is determined that the humic substances are not sufficiently removed in the makeup water 12, the amount of the flocculant 21 to be added to the river water 11 can be adjusted at the flocculating and removing step S12, enabling the makeup water 12 not containing the humic substances to be supplied to the desulfurization apparatus 17.

Therefore, in the humic substance removing method using the river water utilizing flue gas desulfurization system 10 according to the present embodiment, before supplying the river water 11 to the desulfurization apparatus 17 as the makeup water 12, the flocculant 21 is added to the river water 11 at the flocculating and removing step S12 in the amount determined at the first humic substance concentration measuring step S11, and the river water 11 is treated with the activated carbon at the activated carbon removing step S13. In this manner, the humic substances contained in the river water 11 can be removed in advance. Because the makeup water 12 having the humic substances removed therefrom is supplied to the desulfurization apparatus 17, it is possible to suppress the humic substances from inhibiting oxidization of $SO_X$ contained in the limestone gypsum slurry 16 that is used for desulfurization.

Furthermore, by measuring the concentration of the humic substances in the makeup water 12 at the second humic substance concentration measuring step S14, the amount of the flocculant 21 to be added to the river water 11 at the flocculating and removing step S12 can be adjusted. Therefore, the makeup water 12 not containing the humic substances can be steadily supplied to the desulfurization apparatus 17

In the river water utilizing flue gas desulfurization system 10 according to the present embodiment, the pre-treatment facility 13 includes both of the flocculant mixing basin 22 and the activated carbon absorption unit 23; however, the present invention is not limited thereto, and the pre-treatment facility 13 may include only one of the flocculant mixing basin 22 or the activated carbon absorption unit 23.

Furthermore, in the river water utilizing flue gas desulfurization system 10 according to the present embodiment, the pre-treatment facility 13 has the flocculant mixing basin 22 and the activated carbon absorption unit 23 arranged sequentially along the direction in which the river water 11 is supplied; however, the present invention is not limited thereto, and the flocculant mixing basin 22 and the activated carbon absorption unit 23 may be arranged in the reversed order.

Furthermore, in the river water utilizing flue gas desulfurization system 10 according to the present embodiment, the river water 11 is used as the makeup water 12 for diluting the limestone gypsum slurry 16 used for desulfurization; however, the present invention is not limited thereto, and the river water 11 may be used in desulfurization by mixing the river water 11 with the limestone gypsum slurry 16 before bringing the limestone gypsum slurry 16 into a gas-liquid contact with the flue gas 15.

Furthermore, the river water utilizing flue gas desulfurization system 10 according to the present embodiment uses the river water 11 as the makeup water 12; however, the present invention is not limited thereto, and the river water utilizing flue gas desulfurization system 10 can be applied to natural water such as lake water or sea water, or industrial water.

Furthermore, the river water utilizing flue gas desulfurization system 10 according to the present embodiment uses the makeup water 12 obtained from the river water 11 in the desulfurization apparatus 17; however, the present invention is not limited thereto, and the makeup water can be used in any membrane filtration apparatus such as a reverse osmosis (RO) filter, or a steam generator, as long as such an apparatus can use the river water.

INDUSTRIAL APPLICABILITY

As described above, the river water utilizing flue gas desulfurization system and the humic substance removing method according to the present invention are useful in using the river water for making up for ejecting water used in the desulfurization performed in the desulfurization apparatus, and is suitable for being used in a flue gas desulfurization system having a desulfurization apparatus.

EXPLANATIONS OF LETTERS OR NUMERALS 10 river water utilizing flue gas desulfurization system
11 river water
12 makeup water
13 pre-treatment facility
14 apparatus body
15 flue gas
16 limestone gypsum slurry
17 desulfurization apparatus
21 flocculant
22 flocculant mixing basin
23 activated carbon absorption unit
25 river
26 sediments and bulky materials
27 sedimentation pound
28 plants
29 screen
30 river water extracting line
31 pump
32 flocculated liquid
33 sand filter
34 flocculated sludge
36 spent activated carbon
37 makeup water supplying line
38 industrial water
41 flue gas supplying line
42 water supplying line
43 nozzle
44 purified gas
45 liquid mixture
46 air
47 pond
51 first concentration measuring unit
52 second concentration measuring unit
53-1 first pressure measuring unit
53-2 second pressure measuring unit
54 oxidization speed measuring unit

The invention claimed is:

1. A river water utilizing flue gas desulfurization system comprising:
a pre-treatment facility that removes humic substances contained in river water to produce makeup water; and
a desulfurization apparatus that brings sulfur content in flue gas into contact with water to wash out the sulfur content in an apparatus body, wherein
the pre-treatment facility includes a coal-based activated carbon absorption unit that allows the coal-based activated carbon to absorb and remove the humic substances contained in the river water.

2. The river water utilizing flue gas desulfurization system according to claim 1, further comprising a first concentration measuring unit arranged upstream of the pre-treatment facility to measure a concentration of the humic substances in the river water.

3. The river water utilizing flue gas desulfurization system according to claim 2, further comprising a second concentration measuring unit arranged downstream of the pre-treatment facility to measure a concentration of the humic substances remaining in the makeup water.

4. The river water utilizing flue gas desulfurization system according to claim 2, further comprising:
a flocculant mixing basin in which a flocculant is added to the river water to flocculate and remove the humic substances contained in the river water; wherein
the first concentration measuring unit obtains the concentration of the humic substances in the river water; and
the flocculant is added to the river water based on a predetermined relationship between the concentration of the humic substances in the river water and an amount of the flocculant required to be added to remove the humic substances from the river water.

5. The river water utilizing flue gas desulfurization system according to claim 4, wherein
the first concentration measuring unit measures any one of a total organic carbon in and an absorbance of the river water or both of them, and
the flocculant is added to the river water based on a predetermined relationship between the total organic carbon in and the absorbance of the river water, and the amount of the flocculant required to be added to remove the humic substances from the river water.

6. The river water utilizing flue gas desulfurization system according to claim 3, further comprising:
a flocculant mixing basin in which a flocculant is added to the river water to flocculate and remove the humic substances contained in the river water; wherein
the second concentration measuring unit measures the concentration of the humic substances in the makeup water; and
an amount of the flocculant to be added to the river water is adjusted based on a predetermined relationship between the concentration of the humic substances in the river water and the amount of the flocculant required to be added to remove the humic substances from the river water.

7. The river water utilizing flue gas desulfurization system according to claim 6, wherein
the second concentration measuring unit measures any one of a total organic carbon in and an absorbance of the makeup water or both of them, and
the amount of the flocculant to be added to the river water is adjusted based on a predetermined relationship between the total organic carbon in, the absorbance of, and pH of the river water, and the amount of the flocculant required to be added to remove the humic substances from the river water.

8. The river water utilizing flue gas desulfurization system according to claim 1, further comprising:
a first pressure measuring unit that measures a pressure of the river water supplied to the coal-based activated carbon absorption unit; and
a second pressure measuring unit that measures a pressure of the river water ejected out of the coal-based activated carbon absorption unit.

9. The river water utilizing flue gas desulfurization system according to claim 1, further comprising:
a flocculant mixing basin in which a flocculant is added to the river water to flocculate and remove the humic substances contained in the river water;
wherein an iron-based flocculant is used as the flocculant.

10. The river water utilizing flue gas desulfurization system according to claim 1, wherein the humic substances are any one of humic acid and fulvic acid or both of them.

11. A humic substance removing method comprising:
a first step of measuring a concentration of humic substances in river water;

a step of flocculating and removing the humic substances in and from the river water by adding a flocculant to the river water; and a step of absorbing and removing the humic substances in and from the river water by way of a coal-based activated carbon, wherein the concentration of the humic substances in the river water is measured at the first step of measuring; and the flocculant is added to the river water based on a predetermined relationship between the concentration of the humic substances in the river water and an amount of the flocculant required to be added to remove the humic substances from the river water at the step of flocculating and removing.

12. The humic substance removing method according to claim 11, wherein any one of a total organic carbon in and an absorbance of the river water or both of them is measured at the first step of measuring, and the flocculant is added to the river water based on a predetermined relationship between the total organic carbon in and the absorbance of the river water, and the amount of the flocculant required to be added to remove the humic substances from the river water at the step of flocculating and removing.

13. The humic substance removing method according to claim 11, further comprising:

a second step of measuring a concentration of the humic substances remaining in makeup water that is the river water having the humic substances removed therefrom, wherein the concentration of the humic substances in the makeup water is measured at the second step of measuring, and the amount of the flocculant to be added to the river water is adjusted based on the predetermined relationship between the concentration of the humic substances in the river water and the amount of the flocculant required to be added to remove the humic substances from the river water at the step of flocculating and removing.

14. The humic substance removing method according to claim 13, wherein any one of a total organic carbon in and an absorbance of the makeup water or both of them is measured at the second step of measuring, and the amount of the flocculant to be added to the river water is adjusted based on a predetermined relationship between the total organic carbon in and the absorbance of the river water, and the amount of the flocculant required to be added to remove the humic substances from the river water at the step of flocculating and removing.

15. The humic substance removing method according to claim 11, wherein an iron-based flocculant is used as the flocculant.

16. The humic substance removing method according to claim 11, wherein the humic substances are any one of humic acid and fulvic acid or both of them.

17. The river water utilizing flue gas desulfurization system according to claim 1, further comprising a flocculant mixing basin in which a flocculant is added to the river water to flocculate and remove the humic substances contained in the river water.

* * * * *